June 13, 1950  B. D. KAHAN  2,511,270
SLIDE RULE

Filed Feb. 27, 1946  3 Sheets-Sheet 1

INVENTOR.
Benedict D. Kahan
BY
Attorney.

June 13, 1950   B. D. KAHAN   2,511,270
SLIDE RULE
Filed Feb. 27, 1946   3 Sheets-Sheet 3

INVENTOR
Benedict D. Kahan
BY
Attorney

Patented June 13, 1950

2,511,270

UNITED STATES PATENT OFFICE 2,511,270

SLIDE RULE

Benedict D. Kahan, Philadelphia, Pa.

Application February 27, 1946, Serial No. 650,553

27 Claims. (Cl. 235—79.5)

1

This invention relates to calculating devices, and more particularly to calculating devices of the slide rule type.

One object of the present invention is to provide a simplified, compact and highly improved slide rule which occupies a minimum of space and yet insures an accuracy previously obtained only by the use of the larger and more cumbersome slide rules.

Another object is to provide a slide rule having a single logarithmic scale provided on one portion thereof and two cursors or runners adapted for at least two-dimensional movement in unison or relative to each other over the entire extent of said scale.

A further object is to provide a compact device of the stated character having logarithmic, reciprocal, trigonometric and equally divided numerical scales provided thereon, a pair of cursors adapted for movement in unison or relative to each other over the entire extent of said scales, and diagonals provided across the field tracks of said logarithmic, reciprocal, and trigonometric scales for ascertaining logarithms or antilogarithms from said logarithmic and numerical scales, and trigonometric functions or the angles of trigonometric functions from said trigonometric and numerical scales.

A still further object is to provide in a device of the stated character a graduated scale indicating angles from zero degrees to ninety degrees, said scale being arranged in nine parallel field tracks of equal length, interspersing in parallel field tracks between said first-mentioned field tracks ten additional field tracks of equal length having graduated scales indicating angles from sixty-three degrees to ninety degrees, and providing still another field track parallel to the said other tracks indicating angles from approximately eighty-seven degrees and ten minutes to ninety degrees, the graduations in all of said field tracks being spaced in accordance with the numerical values of the sines of the angles indicated, and to further provide a diagonal across all of said field tracks and an equally divided numerical scale adjacent thereto, whereby either the sine of any of the angles indicated or the angle corresponding to the sine thereof may be readily and accurately ascertained.

A still further object is to provide in a device of the stated character a graduated scale indicating angles from zero degrees to forty-five degrees, said scale being arranged in twenty parallel field tracks of equal length, the graduations in said field tracks being spaced in accordance

2 with the numerical values of the tangents of the angles indicated, and to further provide a diagonal across said tracks and equally spaced numerical scales adjacent thereto, whereby either the tangent of any of the angles indicated or the angle corresponding to the tangent thereof may be readily and accurately ascertained.

A still further object is to provide a cylindrical slide rule having logarithmic, reciprocal, trigonometric and equally divided numerical scales provided thereon, and a pair of transparent cursors or runners adapted for simultaneous or independent rotary or longitudinal movement over all of said scales.

A still further object is to provide a cylindrical slide rule wherein the logarithmic, reciprocal and trigonometric scales are arranged in parallel field tracks around the periphery thereof, and to provide cylindrical cursors adapted for movement over said scales, whereby the said slide rule may be manufactured in reduced sizes so as to consume a minimum of space and yet assure maximum accuracy.

Other and further objects will become apparent as the description of the invention progresses.

Referring to the embodiment of the invention shown in Figs. 1 to 10 of the drawings, the numeral 1 designates generally a slide rule consisting of a base cylinder 2 and a pair of tubular cursors or runners 3 and 4 mounted in telescoping relation thereon. The cursors 3 and 4 may be constructed of any suitable transparent material, such as glass, Celluloid or plastic materials. The base cylinder 2 is longer than the cursors 3 and 4 so as to provide hand grips at the ends thereof to permit adjustment of the cursors over the scales provided thereon as will appear more fully hereinafter. Cursor 3 is mounted on base cylinder 2 and is adapted for rotary as well as longitudinal movement thereon, there being sufficient friction between the contacting portions thereof to cause the cursor to remain in adjusted position until it is manually moved to a new position of adjustment. Cursor 4 is mounted on cursor 3 and is adapted for rotary as well as longitudinal movement over the entire surface thereof. Cursor 4 is so fitted on cursor 3 that sufficient friction is provided between the contacting surfaces thereof to prevent relative movement of the cursors except by manual effort when one is held against movement while the other is adjusted relative thereto.

Figures 1, 5, 6:
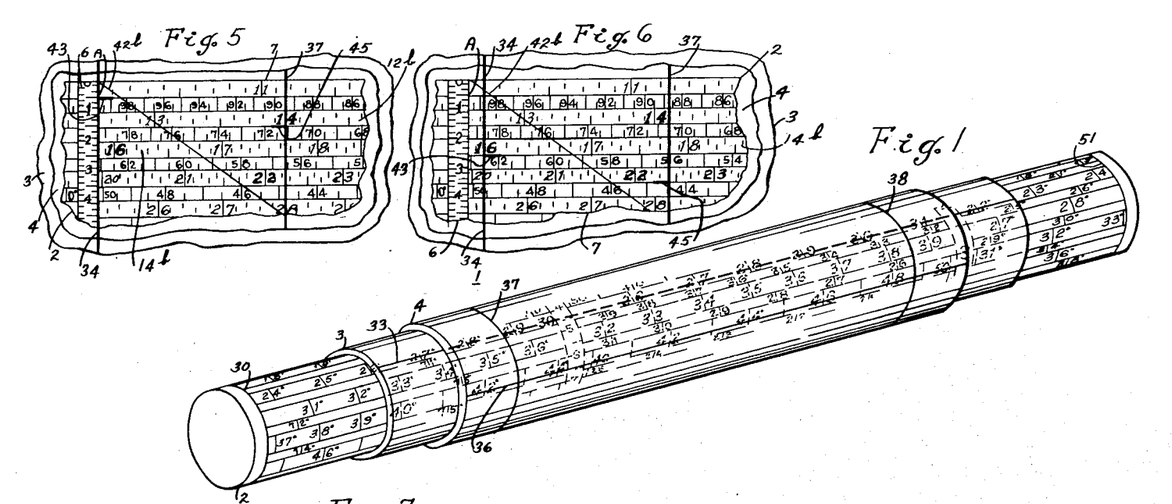
Fig. 1 is a perspective view of the slide rule calculating device comprising the present invention.
Figs. 5 and 6 are views of fragmentary portions of the slide rule illustrating the manner in which multiplication is performed thereon.

As shown in Fig. 1, cursor 3 is longer than cursor 4, thus providing hand grips at the ends thereof to enable said cursors to be moved relative to each other.

Figure 2:
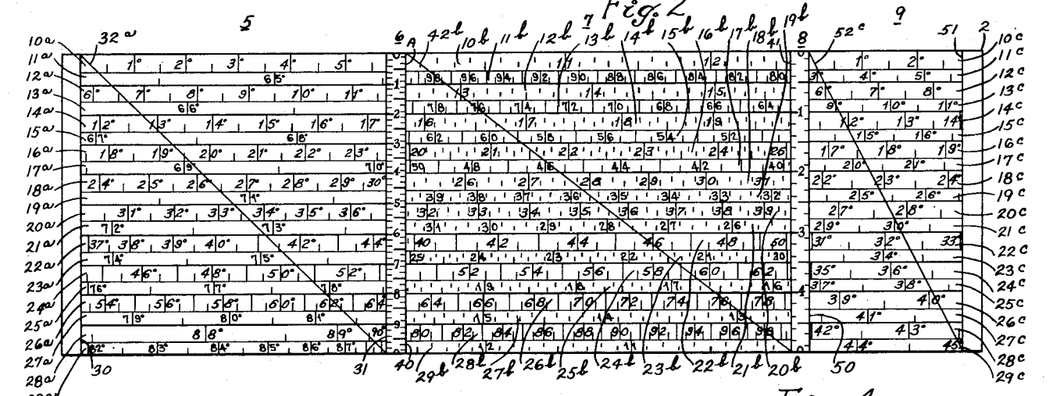
Fig. 2 is a development of the base cylinder of the slide rule showing the various scales and diagonals provided thereon.

Referring to Figs. 1 and 2, the base cylinder 2 has provided thereon five scale sections 5, 6, 7, 8 and 9, respectively, from left to right thereof.

Section 5 comprises twenty parallel scale tracks, indicated respectively by numerals 10$^a$ to 29$^a$, which are equal in length and which extend between boundary lines 30 and 31. Alternate scale tracks 10$^a$, 12$^a$, 14$^a$, 16$^a$, 18$^a$, 20$^a$, 22$^a$, 24$^a$ and 26$^a$ constitute the first series of scale tracks and contain angle designations ranging from zero degrees to 64° 10', and the spacings of the angles indicated therein are in accordance with the numerical value of the sines thereof. The graduations in these tracks are such that the angle designated at the right hand end of one track is identical with that at the left hand end of the next lower track of the series. The angle designation at the right hand end of track 10$^a$, for example, is identical with that at the left hand end of track 12$^a$.

The angles whose sines have arithmetical values in excess of (.9) or angles of approximately 54° 10' are distributed over alternate scale tracks 11$^a$, 13$^a$, 15$^a$, 17$^a$, 19$^a$, 21$^a$, 23$^a$, 25$^a$, 27$^a$ and 29$^a$, which constitute the second series of scale tracks, and the spacings of the angles lying therein are also arranged in accordance with the arithmetical values of the sines thereof. The graduations in these tracks are also such that the angle designation at the right hand end of one track, such as track 11$^a$, is identical with that at the left hand end of the next track of the series or 13$^a$.

Scale track 28$^a$ has distributed over the length thereof in accordance with the arithmetical values of the sines thereof angles whose sines are in excess of (.999), or angles ranging from approximately 87° 26' to 90°. Scale track 28$^a$ constitutes the third series of scale tracks in scale section 5.

In ascertaining the sine of any angle lying in the first series of scale tracks, the digit in the first decimal place thereof corresponds to the track number (0 to 9) of the full track in which the angle lies. The digits beyond the first decimal place correspond to the position of the particular angle between the ends of its respective scale track.

In ascertaining the sine of any angle lying in the second series of scale tracks, the digit in the first decimal place will always be (9) since it lies in a track disposed beyond the ninth full track associated with the first series of scale tracks. The digit in the second decimal place corresponds to the track number (0 to 9) of the full track in which the particular angle in the second series lies. The digits beyond the second decimal place correspond to the position of the particular angle between the ends of its respective scale track.

In ascertaining the sine of any angle lying in the third series of scale tracks, the digits in the first and second decimal places will always be (9) since it will lie in a track disposed beyond the ninth full scale track associated with the first and second series of scale tracks. The digit in the third decimal place will correspond to the track number (9) of the full track in which the angle of the third series lies. The digits beyond the third decimal place will correspond to the position of the particular angle between the ends of its track.

A diagonal line 32$^a$ extends across the entire twenty track scales of section 5 and is provided for ascertaining angles when the arithmetical values of their sines are known, and conversely for ascertaining the arithmetical values of their sines when the angles are known, as will appear more fully hereinafter.

Figure 3:
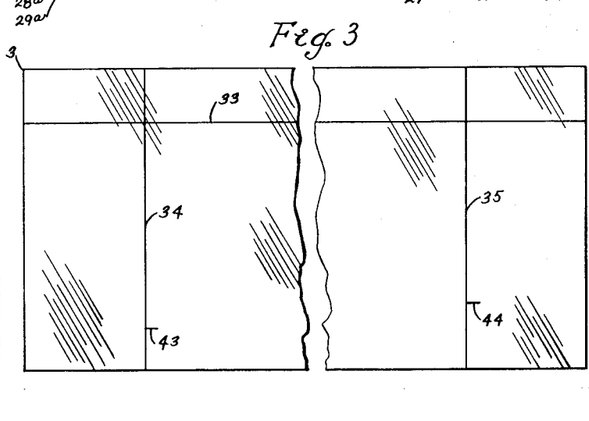
Fig. 3 is a development of one of the cylindrical cursors or runners of the slide rule.
Figure 4:
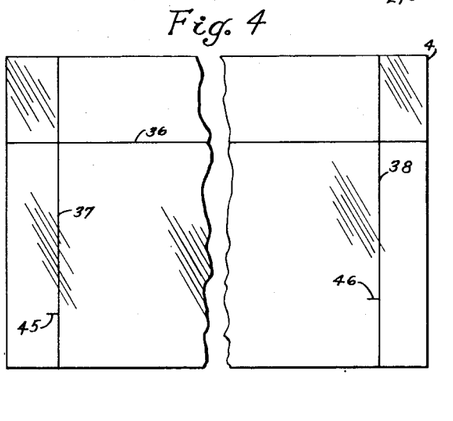
Fig. 4 is a development of the other cylindrical cursor or runner of the slide rule.

Cursor 3 is provided with a longitudinal hairline 33 extending over the entire length thereof and a pair of spaced circumferential hairlines 34 and 35. Cursor 4 also has provided thereon a longitudinally extending hairline 36 and a pair of spaced circumferential hairlines 37 and 38. The circumferential hairlines of cursors 3 and 4 are spaced the same distance apart, the said distance being equal to the length of the scale tracks of section 7.

Scale section 6 is relatively narrow and lies between scale sections 5 and 7, as shown more particularly in Fig. 2. Scale section 6 is divided into ten equally spaced main divisions numbered consecutively from one to ten, and each of the said main divisions is divided into ten equal parts. Each of the main divisions of scale 6 is one-tenth of the circumference of base cylinder 2 and embraces one full track consisting of a deeper track, such as track 10$^a$, and an adjacent narrower track, such as 11$^a$. For example, the space between (0) and (1) on scale section 6 embraces scale tracks 10$^a$ and 11$^a$, the space between (1) and (2) embraces tracks 12$^a$ and 13$^a$, and so on. The number (0) to (9) on scale section 6, accordingly, designate the track numbers of the full tracks of scale section 5.

Figure 7:
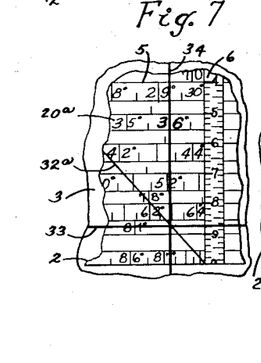
Fig. 7 is a view of a fragmentary portion of the slide rule illustrating the manner in which the sines of angles of the first series or angles corresponding to the sines thereof are ascertained.

From the arrangement the angle graduations provided in scale tracks 10ª to 29ª, the diagonal line 32ª and the adjacent scale section 6 it will be seen that when the angle is known the sine may readily be found on scale section 6, and conversely when the sine of an angle is known the angle may be found on scale section 5. For example, suppose it is desired to ascertain the sine of an angle of 36°, the angle 36° is first located on scale section 5, as shown more prominently in Fig. 7. It will be seen that the angle 36° lies in scale track 20ª approximately one-eighth the length of the track from the right hand end thereof. The full track members, i. e., full tracks (0) to (9), it will be remembered constitute the digits in the first decimal place of the sines of the angles lying therein. The digits in the remaining decimal places correspond to the position that the angle lies between the ends of its respective scale track. Track 20ª is five full tracks from the beginning of scale section 5 (a full track it will be recalled consists of one deep track such as track 10ª and an adjacent narrow track such as track 11ª) but less than six full tracks. Accordingly, the digit in the first decimal place of the sine of that angle is (5). One of the circumferential hairlines on cursor 3, for example hairline 34, is now placed on the graduation corresponding to 36°, as shown in Fig. 7, and the cursor is then rotated until the hairlines 33 and 34 intersect diagonal line 32ª at a common point. The remaining digits are now read on scale section 6 by following horizontal hairline 33 over that scale which, as shown in Fig. 7, equal approximately (.0877). Accordingly, the sine of the angle 36° thus ascertained is (.5877). The first two significant numbers, i. e., (8) and (7), are accurately read on scale section 6, while the third significant number, i. e., (7), must be estimated since it lies between the seventh and eighth graduations between main divisions, numbers (8) and (9), as shown in Fig. 7.

Thus it is seen that the digit in the first decimal place corresponds to the particular track in which the angle lies and the other digits to the position of the angle designated in its particular track. If extreme accuracy is not desired an estimate of the sine of any angle could be made directly. For example, since the position of the 36° angle designation is located approximately seven-eighths the distance from left to right of track 20ª, the second, third and fourth digits would be (8), (7) and approximately (5), respectively, or the sine of that angle under such circumstances would be estimated to be (.5875). By the use of the diagonal line 32ª, however, greater accuracy may be obtained. Since the diagonal line extends across all of the scale tracks and since the full scale tracks are equally spaced in accordance with the main divisions on scale section 6, the exact distance that an angle designation is located from the left hand end of any of the tracks may be found by projecting the point corresponding thereto onto the diagonal line 32ª and then reading the horizontal projection thereof on scale section 6. Since the angles formed by the intersection of the diagonal line 32ª with the horizontal scale track lines are equal, the corresponding sides of the right triangles formed are in direct proportion with each other and consequently by horizontally projecting a point on scale section 6 the exact distance that the particular angle designation or graduation lies to the left of its track may be read on the said scale section 6.

As another example, the sine of an angle of 30° is known to be (.5). Upon reference to Fig. 2 it will be observed that 30° on scale section 5 is five full tracks from the top thereof and falls on the fifth main division of scale section 6 and therefore is read as (.5). Should the sine of the angle 29° be desired, it would be necessary to follow the procedure previously described in order to accurately obtain the value thereof. Since the angle 29° lies short of the end of track 5, the digit in the first decimal place of its sine is (4). Now by vertically projecting the graduation corresponding to 29° onto the diagonal line 32ª and then projecting it longitudinally onto scale section 6, it will be seen that the digits in the second and third decimal places are (8) and (5), respectively, so that the sine of 29°, as just ascertained, therefore is (.485).

Sines of angles in excess of approximately 64° 10' are ascertained in a slightly different manner. It will be remembered that the sine of an angle 64° 10' is approximately (.9) and consequently the digit in the first decimal place of the sine values of all angles greater than 64° 10' will also be (9). Now suppose it is desired to find the sine of the angle 65°. Since 65° is greater than 64° 10', it is seen that the sine thereof will be greater than (.9). It is also seen that the graduation designating 65° falls beyond the ninth full track of the scale and lies in the second series of scale tracks. Since the position of the graduation corresponding to 65° lies in the second series of scale tracks and since it is located intermediate the ends of the first full track, the digit in the second decimal place of the sine thereof is (0), it being remembered that the digits in the second decimal place of the sines of all angles included in the second series of scale tracks correspond to the track numbers of the full tracks in which the said angles lie.

Thus the digits in the first and second decimal places of the sine of the angle 65° are (9) and (0), respectively. In order to ascertain the digits beyond the second decimal place, cursor 3 is adjusted so as to project the graduation corresponding to the angle 65° onto diagonal line 32ª and then projecting the point of intersection thereof horizontally onto scale section 6. The reading on scale section 6 indicates that the digits in the third and fourth decimal places are (6) and (3), respectively. Consequently the sine of the angle 65° thus ascertained is (.9063).

Figures 8, 9:
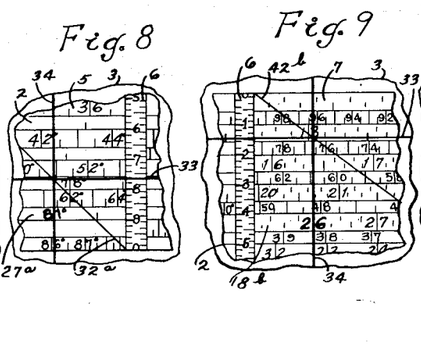
Fig. 8 is a view of a fragmentary portion of the slide rule illustrating the manner in which the sines of angles of the second series or angles corresponding to the sines thereof are ascertained.
Fig. 9 is a view of a fragmentary portion of the slide rule illustrating the manner in which logarithms and anti-logarithms are obtained.

In the event that it is desired to find the sine of an angle of 81°, the same general procedure is followed. Fig. 8 illustrates a sample calculation wherein it will be noted that the angle 81° is shown more prominently than the other angle designations disposed adjacent thereto. Inasmuch as the angle 81° is greater than the angle 64° 10', the value of the digit in the first decimal place of the sine will be (9). As shown in Figs. 2 and 8, the graduation corresponding to the angle 81° is located near the right hand end of scale track 27ª, which track lies between full tracks (8) and (9). Accordingly, the value of the digit in the second decimal place of the sine is (8). Now by vertically projecting the graduation corresponding to the angle 81° onto the diagonal line 32ª and then horizontally projecting the point of intersection thereof over scale section 6, the value of the digits in the third and fourth decimal places will be found to be (7) and approximately (6). Consequently the sine of the angle of 81° has thus been ascertained to be (.9876).

The invention also contemplates the method of accurately obtaining the sines of angles from approximately 87° 26' to 90°. The value of the digits in the first three decimal places of the sines of angles of approximately 87° 26' to 90° is (9) in each case, or the reading would be approximately (.999). Accordingly, should it be desired to ascertain, for example, the sine of the angle 88°, it is seen that since this angle is greater than the angle 87° 26' the digits in each of the first three decimal places will be (9). From the description of the various scale tracks in scale section 5, it is also seen that the graduation corresponding to 88° lies beyond the end of the ninth full track of the first series of scale tracks and, accordingly, the value of the digit in the first decimal place of the sine would be (9). It is also seen that the graduation corresponding to the angle 88° lies in track 29$^a$, which is also beyond the ninth full track of the second series of scale tracks, and consequently the value of the digit in the second decimal place of the sine is also (9). Moreover, it will also be observed that the graduation corresponding to 88° also lies in the scale track 28$^a$, which also extends beyond the ninth full track of the third series of scale tracks, and accordingly the value of the digit in the third decimal place would also be (9). In order to determine the digits beyond the third decimal place, the graduation corresponding to the angle 88° in track 28$^a$ is vertically projected as previously described onto the diagonal line 32$^a$, and the point of intersection thereof is then projected horizontally over scale track 6. It, therefore, will be seen that the values of the digits in the fourth and fifth decimal places are (3) and (9), respectively. Accordingly, the sine of the angle 88° thus ascertained is found to be (.99939).

From the foregoing description it is also seen that for the larger angles whose graduations are spaced closer together and accordingly the numerical values of the sines thereof are more difficult to obtain by the use of the ordinary type of slide rule may be obtained with accuracy to five decimal places by the use of the present invention.

The method of ascertaining the angles when the numerical values of their sines are known is substantially the reverse of that just described. Referring to Figs. 2 and 7, suppose it is desired to find the angle whose sine is (.5877). Since the digit in the first decimal place of the sine is (5) it is apparent that the angle in question lies somewhere between full tracks (5) and (6) or in scale track 20$^a$. Accordingly, the horizontal hairline 33, for example, of cursor 3 is placed on scale section 6 to correspond with the digits in the second, third and fourth decimal places of the sine. The point of intersection of hairline 33 with diagonal line 32$^a$ is now projected vertically to track 5 and as shown in Fig. 7 the vertical projection will coincide with the graduation in scale track 20$^a$, corresponding to 36°.

Now suppose it is desired to find the angle whose sine is (.9063). From the foregoing description it is apparent that the angle must lie between full tracks (9) and (10). Accordingly, the hairline 33 will be placed on scale section 6 at a point corresponding to 63. The point of intersection of hairline 33 with diagonal line 32$^a$ is then projected vertically, which, it will be seen, coincides with the graduation in scale track 11$^a$ corresponding to 65°.

Now suppose it is desired to find the angle whose numerical sine value is (.9876). Since the digit in the first decimal place is (9), it is readily apparent that the angle lies beyond the ninth scale track. Since the digit in the second decimal place is (8), it will be apparent that the angle in question lies between the eighth and ninth full scale tracks. Accordingly, the horizontal hairline 33 on cursor 3 is placed at a point on scale section 6 corresponding to (76), and the point of intersection of the said hairline 33 with the diagonal line 32$^a$ is projected vertically to the eighth scale track or scale track 27$^a$ where it will be found to coincide with the graduation corresponding to the angle 81°.

Now suppose it is desired to find the angle whose sine is equal to (.99939). It will be readily apparent from the description given hereinbefore that the angle must lie in scale track 28$^a$. Accordingly, the horizontal hairline 33 on cursor 3 is placed at (39) in scale section 6 and the point of intersection of hairline 33 with diagonal line 32$^a$ is projected vertically to scale track 28$^a$ where it will be found to coincide with the graduation corresponding to 88°.

From the foregoing description it is seen that the angles whose numerical sines are known may also be readily determined by the use of the present invention.

Scale section 7, it will be observed, is also comprised of scale tracks 10$^b$ to 29$^b$ which coincide respectively with scale tracks 10$^a$ to 29$^a$. Scale tracks 10$^b$ to 29$^b$ are equal in length and extend between the lines 40 and 41 disposed at the right and left, respectively, of scale sections 6 and 8. The relatively deep scale tracks 10$^b$, 12$^b$, 14$^b$, 16$^b$, 18$^b$, 20$^b$, 22$^b$, 24$^b$, 26$^b$ and 28$^b$ contain a logarithmic scale ranging from ten to one hundred. The graduations in these tracks are such that the number indicated at the right hand end of any of these tracks is identical with that at the left hand end of the next track of the series. For example, the number indicated at the extreme right hand end of scale track 10$^b$ is identical with that indicated at the extreme left hand end of scale track 12$^b$.

The narrower scale tracks 29$^b$, 27$^b$, 25$^b$, 23$^b$, 21$^b$, 19$^b$, 17$^b$, 15$^b$, 13$^b$ and 11$^b$ contain a reciprocal logarithmic scale. Consequently the reciprocal of any number appearing in the deeper scale tracks is read immediately therebelow in the adjacent narrower scale. For example, the reciprocal of any number in track scale 10$^b$ is obtained immediately beneath in track scale 11$^b$.

A diagonal line 42$^b$ extends across all of the scale tracks of scale section 7 as shown more particularly in Fig. 2.

As in the angle scale tracks of scale section 5 a full scale track comprises one deeper track such as track 10$^b$ and one narrow track such as track 11$^b$. There are ten such full scale tracks and they correspond to the main divisions of scale section 6.

Referring to Fig. 1, it will be seen that cursor 3 is shorter than base cylinder 2, thereby providing spaces on the base cylinder for hand grips when adjusting the cursors relative to the said base cylinder. It is also seen that cursor 4 is shorter than cursor 3 so that the latter may be held stationary while the former is being adjusted thereon. As pointed out hereinbefore, the cursor 3 is so fitted on base cylinder 2 while cursor 4 is so fitted on cursor 3 that sufficient friction exists therebetween to cause the said cursors to remain in adjusted position until manual effort is exerted thereon to adjust them to a new position of adjustment. As shown in Fig. 3, a pair of short hairlines 43 and 44 extend to the right, respectively, of hairlines 34 and 35. Hairlines 43 and 44 are spaced circumferentially a distance equal to one full track space. Cursor 4 also has a similar pair of short hairlines 45 and 46 extending to the left, respectively, of hairlines 37 and 38. These hairlines are spaced apart circumferentially, also, a distance equal to one full track space.

The starting point for all calculations is at A which lies between scale tracks 10$^b$ and 11$^b$ on line 40. Results obtained by multiplication or division will accordingly be read on the deeper scale tracks above the division lines, while reciprocals of numbers will be read below the said divisions lines. Inasmuch as but one logarithmic scale is employed, multiplication and division are performed by adjusting the cursors 3 and 4 with respect to base cylinder 2. Figs. 5 and 6 illustrate how multiplication or division may be performed, the number (14) being multiplied by the number (16), these numbers being shown more prominently than the others in the said Figs. 5 and 6. To begin the calculation, the point of intersection of hairlines 34 and 43 on cursor 3 is placed over the starting point A. Cursor 3 is now held stationary while cursor 4 is adjusted to bring the point of intersection of hairlines 37 and 45 over the lower end of the graduation corresponding to number (14) in scale track 12$^b$. Both cursors are now moved in unison circumferentially and longitudinally until the point of intersection of hairlines 34 and 43 on cursor 3 overlies the lower end of the graduation corresponding to numeral (16) in scale track 14$^b$. The product is now read on scale track 16$^b$ above the point of intersection of hairlines 37 and 45 on cursor 4, which as shown in Fig. 6 is (224).

In order to divide the number (224) by the number (16), the point of intersection of hairlines 34 and 43 on cursor 3 is placed over the lower end of the graduation corresponding to the number (224) in scale track 16$^b$, while the point of intersection of the hairlines 37 and 45 on cursor 4 is placed over the lower end of the graduation in scale track 14$^b$ corresponding to the number (16). Both cursors are now moved in unison to bring the point of intersection of hairlines 37 and 45 over A, the starting point. The quotient is now read above the point of intersection of hairlines 34 and 43 on cursor 3, which it will be seen is (14).

Should it be desired, for example, to multiply the number (5) by the number (6) the point of intersection of hairlines 34 and 43 on cursor 3 is first placed over the staring point A. The point of intersection of hairlines 38 and 46 on cursor 4 is now placed over the lower end of the graduation in scale track 22$^b$ corresponding to the number (5). Both cursors are now moved in unison until the point of intersection of hairlines 34 and 43 overlies the lower end of the graduation in scale track 24$^b$ corresponding to the number (6). The product will now be read in the scale track over the point of intersection of hairlines 37 and 45 on cursor 4, which will be found to be (30). In this instance it will be noted that the hairlines 38 and 46 on cursor 4 were used in the original setting instead of the hairlines 37 and 45. It is seen that if the hairlines 37 and 45 were used as previously described, the product reading would fall outside the limits of scale section 7. Inasmuch as the length of each of the scale tracks 10$^b$ to 29$^b$ is equal to the distance between hairlines 34 and 35 of cursor 3 and hairlines 37 and 38 of cursor 4 and since hairlines 43 and 44 and hairlines 45 and 46, respectively, are spaced apart circumferentially a distance equal to one full track space, the product of such numbers may be accurately read by using the oppositely disposed hairlines on cursor 4 from those used in the original setting. In other words, the graduation over the point of intersection of hairlines 37 and 45 is in the track below a distance from the left hand end thereof, corresponding to the extension of the scale track thereabove that would have been required had the hairlines 37 and 45 been used in the original setting instead of hairlines 38 and 46. It, therefore, is seen that if the product would extend beyond the limits of the scale if hairlines 45 and 37 were used in the original setting, as well as for indicating the product, the hairlines 38 and 46 are used in the original setting and hairlines 37 and 45 are used in locating the product. It is also seen that hairlines 35 and 44 of cursor 3 may be used in the original setting instead of hairlines 34 and 43 if it is so desired.

By the use of the logarithmic and reciprocal logarithmic scales shown in scale section 7, multiplication of any numbers may be performed by dividing the multiplicand by the reciprocal of the multiplier or by dividing the multiplier by the reciprocal of the multiplicand, and division may be performed by multiplying the dividend by the reciprocal of the divisor.

Scale section 7 along with scale section 6 may be utilized for the purpose of ascertaining logarithms of numbers, and conversely for ascertaining the anti-logarithms in case the logarithms of the numbers are known. As pointed out herinbefore, the logarithmic scale is embraced in ten full track spaces, each space corresponding to one-tenth of the circumference of the base cylinder or of one of the main divisions of scale section 6. It has also been pointed out that the diagonal line 42$^b$ extends across all the scale tracks of scale section 7. In view of the fact that the angles formed by the intersection of said diagonal line with the longitudinal track lines are equal, the corresponding sides of the right triangles thus formed are in direct proportion with each other.

Accordingly, suppose it should be desired to ascertain the logarithm of the number (26). Upon reference to Figs. 2 and 9, it will be seen that the number (26) is located in scale track 18$^b$ or in the fifth full track of the scale, the number (26) being shown prominently in Fig. 9. Since the graduation corresponding to the number (26) is short of the end of the fifth full track it consequently lies between tracks 4 and 5, and therefore the digit in the first decimal place of the mantissa of the logarithm would be (4). Now by projecting the graduation corresponding to the number (26) vertically onto the diagonal line 42$^b$ by the use, for example, of hairline 34 of cursor 3 and then projecting the point of intersection thereof longitudinally onto scale 6 by the use of longitudinally extending hairline 33, it will be seen that the digits in the second, third and fourth decimal places of the mantissa are approximately (1), (4) and (9), respectively. Consequently, the mantissa of the logarithm of the number (26) is (.4149). Since the number (26) lies between (10) and (100), the characteristic of the logarithm, as is well known, would be (1) and the entire logarithm thus ascertained would be (1.4149).

In the event that it is desired to ascertain the number whose logarithm is (1.4149) a reverse of the procedure just described should be followed. Inasmuch as the digit in the first decimal place of the mantissa of the logarithm is (4), it will be readily apparent that the number will lie somewhere between the fourth and fifth full track spaces. Consequently, the horizontal hairline 33 is placed over the scale section 6 at a point corresponding to (149) and the cursor is moved longitudinally until the point of intersection of hairlines 33 and 34 overlies diagonal line 42$^b$. By following the hairline 34 to the fifth full track it will be seen that it coincides with the graduation thereon corresponding to the number (26).

In other words, the digit in the first decimal place of the mantissa of a logarithm is represented by the full track space in which the number is located and the digits in the remaining decimal places of the mantissa correspond to the distance the said number is located between the ends of its respective scale track. The full track in which a number lies may be ascertained from scale section 6. The diagonal line 42$^b$ is utilized to enable the determination of the exact location of the number in its respective track scale. By the use of diagonal line 42$^b$ and one of the horizontal and vertical hairlines on either of the cursors, the fractional distance that the number is located from left to right of its respective scale track may also be immediately ascertained on scale track 6.

Scale section 9 also contains twenty scale tracks 10$^c$ to 29$^c$, which coincide respectively with the scale tracks 10$^a$ to 29$^a$ and 10$^b$ to 29$^b$ previously described. The scale tracks 10$^c$ to 29$^c$ of scale section 9 contain angle designations from 0° to 45°, and are graduated in accordance with the arithmetical values of the tangents thereof. Scale tracks 10$^c$ to 29$^c$ extend between the line 50 at the right hand end of scale section 8 and the line 51 provided near the right hand end of base cylinder 2. A diagonal line 52$^c$ extends across all the scale tracks 10$^c$ to 29$^c$, as shown more particularly in Fig. 2.

into five main divisions marked (0), (1), (2), Scale section 8, it will be observed, is divided (3) and (4), each main division embracing a distance equal to one-fifth the circumference of the base cylinder 2. Each of the main divisions of scale section 8 is sub-divided into ten equal parts, the graduations extending alternately from lines 50 and 41 bounding the right and left hand sides of said scale section, respectively.

Referring to scale section 9, it will be observed that since the tangent of an angle of 45° is unity and since twenty scale tracks are employed to indicate angles from 0° to 45°, which are spaced in the scale tracks in accordance with the numerical values of the tangents of said angles, each of the said twenty scale tracks represents a value when ascertaining the tangents of any of said angles of one-twentieth or (.05) when expressed decimally. Scale section 8, being divided into five equal parts, may be employed to represent the value of one of the scale tracks 10$^c$ to 29$^c$, each main division thereof having therefore a value of (.01).

Figure 10:
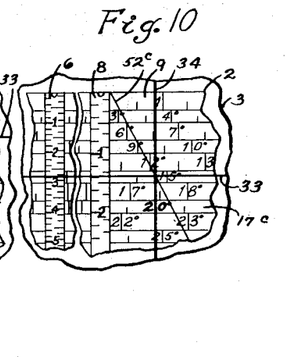
Fig. 10 is a view of a fragmentary portion of the slide rule illustrating the manner in which tangents may be obtained when the angles thereof are known, and conversely how angles may be formed when the tangents thereof are known.
Figure 11:
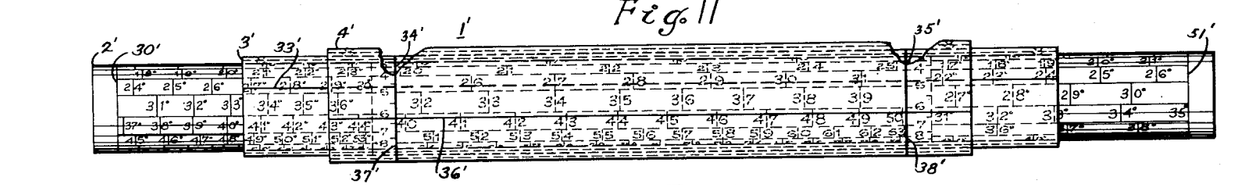
Fig. 11 is a side elevational view of a slide rule of an alternative construction.

From the foregoing description it is seen that should it be desired to ascertain the tangent of the angle 20°, the hairline 34 of cursor 3, for example, is caused to coincide with the graduation in scale track 17$^c$ corresponding to the said angle 20° (Fig. 10). Cursor 3 is now rotated on base cylinder 2 until hairlines 33 and 34 intersect diagonal line 52$^c$ at a common point, which point is then projected over scale section 8 by hairline 33. It will be seen that hairline 33 crosses scale section 8 at a point corresponding to approximately (.0139) since each main division of scale section 8 has a value of one one-hundredth. Now since the angle 20° lies seven complete scale tracks from the beginning of the scale, the tangent will be equal to seven times five one-hundredths plus the faction equal to the distance that the graduation corresponding to the angle 20° lies from the left hand end of scale track 17$^c$, which as previously found on scale section 8 is approximately (.0139). Consequently the tangent of the angle 20° thus ascertained is (.35) plus (.0139) or (.3639).

In the event that it is desired to ascertain the angle whose tangent is (.3639) it is readily apparent that since each complete scale track of scale section 9 has a value of five one-hundredths, the angle must lie in the eighth track or in scale track 17$^c$. Since the arithmetical value of seven tracks is (.35), the difference between (.3639) and (.35) or (.0139) is located on scale section 8 and is projected onto diagonal line 52$^c$ by hairline 33. By projecting the point of intersection of hairline 33 and diagonal line 52$^c$ circumferentially by hairline 34 onto scale track 17$^c$, it will be found that said hairline coincides with the graduation therein corresponding to the angle 20°.

Instead of counting tracks to obtain the portion of the tangent represented by complete scale tracks, the track line above the angle involved may be projected longitudinally onto scale track 6. Upon reference to Fig. 10, it will be seen that the track line above the angle 20° intersects scale section 6 at a point below (35). Consequently the tangent of the angle 20° is (.35) plus a fraction which as previously described was found on scale section 8 to be (.0139).

It, therefore, is seen that the present invention also provides a simplified and rapid method of accurately ascertaining the numerical values of the tangents of angles, and conversely of ascertaining the angles when the tangents are given.

Figs. 11 to 15 illustrate a slide rule of an alternative and somewhat simplified construction. This construction also comprises a base cylinder 2' and tubular cursors 3' and 4' mounted in telescoping relation thereon.

Figure 13:
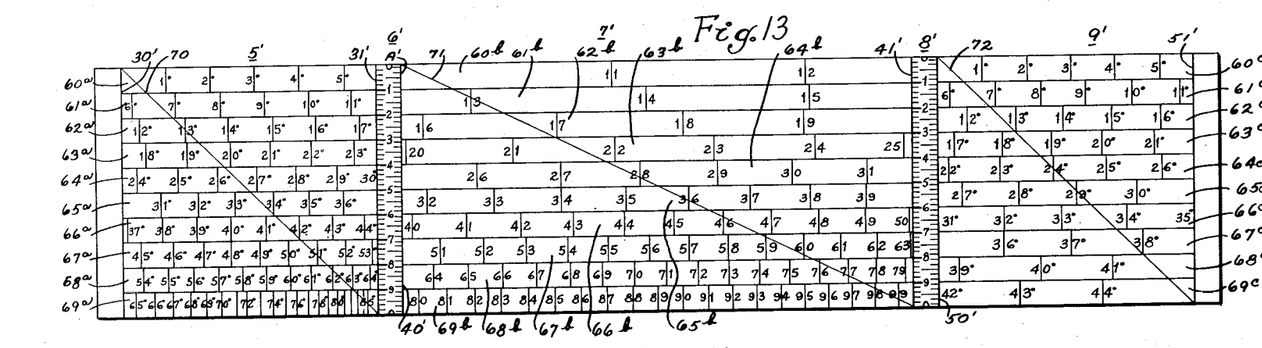
Fig. 13 is a development of the base cylinder of the slide rule shown in Figs. 11 and 12, showing the various scales and diagonals provided thereon.

Base cylinder 2', as shown in the development thereof in Fig. 13, contains scale sections 5', 6', 7', 8' and 9'.

Scale section 5' comprises ten scale tracks 60$^a$ to 69$^a$ arranged in parallel relation and extending between parallel lines 30' and 31'. A diagonal line 70 extends across all the scale tracks 60$^a$ to 69$^a$ as shown in Fig. 13. Scale tracks 60$^a$ to 69$^a$ indicate angles ranging from 0° to 90°, and the graduations corresponding thereto are spaced in accordance with the numerical values of the sines thereof.

Scale section 6' is relatively narrow and is divided into ten main divisions corresponding to the scale tracks 60$^a$ to 69$^a$, and each main division is equal to one-tenth the circumference of the base cylinder 2'. Each of the main divisions of scale section 6' is sub-divided into ten equal parts.

Figure 14:
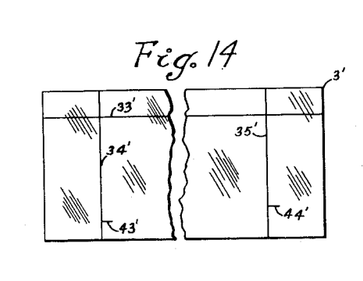
Fig. 14 is a reduced development of one of the cursors of the slide rule shown in Fig. 11.
Figure 15:
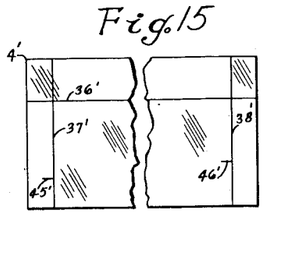
Fig. 15 is a reduced development of the other of the cursors of the slide rule shown in Fig. 11.

Cursor 3' is provided with a horizontal hairline 33', a pair of spaced circumferential hairlines 34' and 35', and a pair of short hairlines 43' and 44'. Cursor 4' also has provided thereon a longitudinally extending hairline 36', a pair of spaced circumferential hairlines 37' and 38', and a pair of short hairlines 45' and 46'. Hairlines 43' and 44' of cursor 3' and hairlines 45' and 46' of cursor 4' are spaced apart circumferentially a distance equal to one track space.

The method of ascertaining the sines of angles by the uses of scale sections 5' and 6' is similar to that previously described in connection with the construction shown in Figs. 1 and 2. Suppose, for example, it is desired to obtain the sine of the angle 36° which it will be observed lies intermediate the ends of the sixth track or in scale track 65ª. The digit in the first decimal place of the sine accordingly is (5). Now by using hairline 34' and 33' of cursor 3', for example, and first projecting the graduation corresponding to angle 36° onto the diagonal line 70 and then horizontally projecting the point of intersection over scale section 6', the digits in the second, third and fourth decimal places will be found to be eight, seven and seven, respectively. The numerical value of the sine of the angle 36° thus ascertained accordingly is (.5877).

To ascertain the angle whose sine is (.5877) the procedure just describe is reversed. Since the digit in the first decimal place of the sine is (5), it is apparent that the angle will lie between the fifth and sixth tracks or in scale track 65ª. Horizontal hairline 33' is now placed across scale section 6' at a point corresponding to (.877), and the point of intersection thereof on diagonal line 70 is projected circumferentially by hairline 34' to scale track 65ª where it will be found to coincide with the graduation corresponding to the angle 36°.

Scale section 7' also comprises ten scale tracks 60ᵇ to 69ᵇ which coincide with scale tracks 60ª to 69ª, respectively, of scale section 5'. Scale tracks 60ᵇ to 69ᵇ extend between lines 40' and 41' and contain a logarithmic scale of numbers from (10) to (100). A diagonal line 71 extends across all the scale tracks 60ᵇ to 69ᵇ.

The method of performing multiplication or division on scale section 7' is substantially the same as that previously described in connection with scale section 7. Suppose it is desired to multiply the number (14) by the number (16), the point of intersection of hairlines 34' and 43' on cursor 3' is placed over the starting point A'. Cursor 4' is now moved relatively to cursor 3' to bring the point of intersection of hairlines 37' and 45' on cursor 4' over the upper end of the graduation corresponding to numeral (14). Both cursors are now moved in unison to bring the point of intersection of hairlines 34' and 43' on cursor 3' over the upper end of the graduation corresponding to numeral (16). The product is found beneath the point of intersection of hairlines 37' and 45' on cursor 4', which it will be observed is (224).

To divide the number (224) by the number 16, the point of intersection of hairlines 34' and 43' is placed over the upper end of the graduation corresponding to numeral (224). Cursor 4' is now moved relatively to cursor 3' until the point of intersection of hairlines 37' and 45' is over the upper end of the graduation corresponding to the number (16). Both cursors are now moved in unison to bring the point of intersection of hairlines 37' and 45' over the starting point A'. The quotient will be found beneath the point of intersection of hairlines 34' and 43' on cursor 3', which it will be noted is (14).

Scale section 7' and the adjacent scale section 6' may also be utilized to ascertain the logarithm of any number or to obtain the anti-logarithm when the logarithm of any number is known. Suppose, for example, that it is desired to obtain the logarithm of the number (26). As shown in Fig. 13, the number (26) lies intermediate the ends of scale track 64ᵇ or the fifth track. Since the graduation corresponding to the number (26) is located at a point short of the end of the fifth track, the digit in the first decimal place of the mantissa of the logarithm is (4). By projecting the graduation corresponding to the number (26) onto the diagonal 71 by the use, for example, of hairline 34' on cursor 3' and then projecting the point of intersection horizontally over scale 6' by use of hairline 33', it will be seen that the digits in the second, third and fourth decimal places of the mantissa are approximately (1), (4) and (9), respectively. Consequently the mantissa of the logarithm of the number (26) is (.4149). Since the number (26) lies between (10) and (100), the characteristic of the logarithm is (1). Accordingly, the entire logarithm of the number (26) is (1.4149).

In order to find the anti-logarithm of the logarithm (1.4149), the number (149) is first located on scale section 6' and projected onto diagonal 71 by hairline 33'. Since the digit in the first decimal place is (4), it will be apparent that the number sought lies between the fourth and fifth tracks or intermediate the ends of scale track 64ᵇ. Accordingly, by projecting the point of intersection of hairline 33' and diagonal 71 circumferentially by the use of hairline 34', it will be seen that hairline 34' will coincide with the graduation corresponding to number (26). Since the characteristic is (1), the anti-logarithm thus ascertained is (26).

Scale section 8' is identical with scale section 6' and lies between side lines 41' and 50'.

Scale section 9' is comprised of ten scale tracks 60ᶜ to 69ᶜ which coincide respectively with the scale tracks 60ª to 69ª and 60ᵇ to 69ᵇ, previously described, and which extend between side line 50' of scale section 8' and the line 51' provided near the right hand end of base cylinder 2'. A diagonal line 72 extends across all the scale tracks 60ᶜ to 69ᶜ, as shown in Fig. 13.

Scale tracks 60ᶜ to 69ᶜ contain angle designations from 0° to 45° and are graduated in accordance with the arithmetical values of the tangents thereof. It is apparent that since the tangent of the angle 45° is unity and since ten scale tracks are employed to indicate angles ranging from 0° to 45°, each of the full scale tracks 60ᶜ to 69ᶜ represents a value of one-tenth when ascertaining the tangents of any of the angles. It is also seen that since scale section 8' is divided into ten equal parts it not only may be utilized to indicate the track number involved but also to indicate the fractional distance a number may lie between the ends of any scale track.

From the foregoing description it is seen that should it be desired to ascertain the tangent of the angle 20°, the hairline 34', for example, on cursor 3' is caused to register with the graduation in scale track 63ᶜ corresponding to the angle 20°. Since the angle 20° lies intermediate the ends of scale track 63ᶜ, the value of the tangent is less than four-tenths and consequently the digit in the first decimal place of the tangent is (3). Cursor 3' is now rotated on base cylinder 2' until hairlines 33' and 34' intersect the diagonal line 72 at a common point, which point of intersection is projected longitudinally over scale section 8' by hairline 33'. It will be observed that hairline 33' crosses scale section 8' on a line corresponding to approximately (639), the digits (6), (3) and (9) constituting the second, third and fourth decimal places, respectively, of the tangent. Consequently the tangent of the angle 20° thus ascertained is (.3) plus (.0639) or (.3639).

In order to ascertain the angle whose tangent is (.3639) the horizontal hairline 33' of cursor 3' is caused to cross scale section 8' at a point corresponding to (639). The point of intersection of hairline 33' on diagonal line 72 is projected circumferentially by hairline 34' to the fourth track since from the value of the sine it is apparent that the angle will lie intermediate the ends of scale track 63c, the fourth track of the series. It will be found by so projecting the said point of intersection that the hairline 34' coincides with the graduation corresponding to 20°.

It, therefore, is seen that the different scale sections of the slide rule illustrated in Figs. 11 to 15 also enable accurate calculations of various kinds to be made.

In order to facilitate relative movement of base cylinder 2' and the cursors 3' and 4' and to prevent grit or other foreign matter from spreading over the scales, spacing means are provided. As shown more particularly in Fig. 12, cursor 3' has provided thereon a series of embossments 73 which constitute the bearing surfaces between the said cursor and base cylinder 2'. Cursor 4' is likewise provided with a series of embossments 74, which form the bearing surfaces between cursor 4' and cursor 3'. The embossments 73 and 74 may be spaced longitudinally, as well as circumferentially, and provide a clearance space between the main portions of the cursors and base cylinder, and accordingly frictional contact between said parts is made only at spaced points. This not only reduces the friction between the surfaces of these elements but also maintains the surfaces clean and thereby assures easy reading of the graduations on the scales.

The cursors 3 and 4 and 3' and 4', as previously described, may be constructed of any suitable transparent material such as glass, Celluloid or plastic materials.

Figure 16:
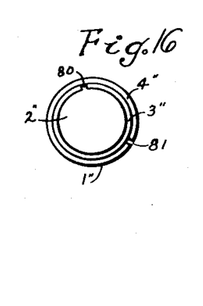
Fig. 16 is an end view of a further modification of the present invention.

Fig. 16 shows an end view of a slide rule 1" of a further modified construction. Slide rule 1" also comprises a base cylinder 2" having scale tracks (not shown) provided thereon, similar to those shown in Fig. 2 or in Fig. 13. A pair of cursors 3" and 4" are mounted in telescoping relation on base cylinder 2". Cursors 3" and 4" may be constructed of any suitable transparent resilient material and are split horizontally, as shown at 80 and 81, respectively, on Fig. 16. The inside diameter of cursor 3" is slightly smaller than the outside diameter of base cylinder 2", and, accordingly, when the said cursor is inserted on the base cylinder it will frictionally grip the latter. The inside diameter of cursor 4" is also slightly smaller than the outside diameter of cursor 3", and, accordingly, it also in assembly will frictionally grip cursor 3".

Figure 12:
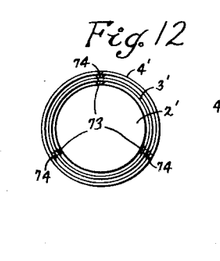
Fig. 12 is an end view of the slide rule shown in Fig. 11.

Embossments such as those shown at 73 and 74 in Fig. 12 may be provided on either or both of cursors 3" and 4", if it is so desired to provide point contact between the adjacent surfaces thereof.

The slide rules shown and described herein, it is seen, are of a simplified construction and yet enable various types of calculations to be made with a high degree of accuracy. By arranging the different scales in parallel tracks in the manner shown herein, the graduations thereof may be greatly extended and yet the slide rule as a whole occupies a minimum of space. It is also seen that by using two cursors in making certain calculations the necessity of providing additional scales is eliminated.

It is also seen that slide rules constructed in accordance with the present invention are not limited to cylindrical structures but may be flat or of any other desired shape.

It will be noted that the short hairlines 43 and 44 on cursor 3 extend to the right of hairlines 34 and 35, respectively, as shown in Fig. 3; while the hairlines 45 and 46 on cursor 4 extend to the left of hairlines 37 and 38, respectively, as shown in Fig. 4. This is done so that the different hairlines may be readily identified. It is apparent, however, that the hairlines may be arranged in any desired manner without departing from the present invention.

Accordingly, while the embodiments of the invention, herein shown and described, are admirably adapted to fulfill the objects primarily stated, it is to be understood that it is not intended to limit the invention thereto, since it may be embodied in other forms, all coming within the scope of the claims which follow.

What is claimed is:

1. In a device of the class described, the combination of a cylindrical member having one or more scales provided thereon, a cursor mounted on said member and adapted for rotary and longitudinal movements over said scale, and means providing point contact between said member and said cursor.

2. In a device of the class described, the combination of a cylindrical member having one or more graduated scales provided over the periphery thereof, a cursor mounted for rotary and longitudinal movements over said scales, means providing point contact between said member and cursor, a second cursor mounted on said first mentioned cursor, and means providing point contact between said first and second cursors.

3. In a device of the class described, the combination of a cylindrical base member, a resilient substantially tubular cursor movable on said member and adapted to frictionally engage the latter, and a second resilient substantially tubular cursor movable on said first mentioned cursor and adapted to frictionally engage the latter, both the first and second cursors being provided with slits extending from end to end whereby binding between the first and second cursors and between the first cursor and the base member is avoided, regardless of relative expansion and contraction of the cursors and the base.

4. In a device of the class described, the combination of a member having a graduated scale provided thereon, said scale being arranged in a plurality of parallel tracks, a diagonal line extending across all of said tracks, a second scale provided adjacent said first mentioned scale, said second scale having equally spaced graduations thereon corresponding to the tracks of said first mentioned scale, and means for projecting any of the graduations in said scale tracks onto said diagonal and thence onto said second scale, whereby the exact position that any graduation lies between the opposite ends of its respective track may be read directly on said second scale and any reading on said second scale may be projected onto any of said scale tracks at the point between the ends of said scale tracks corresponding to the said reading on said second scale.

5. In a device of the class described, the combination of a member having a graduated scale provided thereon, said scale being arranged in a plurality of parallel tracks of equal length, a diagonal line extending across all of said tracks from beginning to end thereof, a second scale provided adjacent said first mentioned scale, said second scale having equally spaced graduations thereon corresponding to the tracks of said first mentioned scale, and means for projecting any of the graduations in said scale tracks onto said diagonal and thence onto said second scale, whereby the exact position that any graduation lies between the opposite ends of its respective track is indicated on said second scale and any indication on said second scale may be projected onto any of said scale tracks at a point between the ends of the latter corresponding to the indication on said second scale.

6. In a device of the class described, the combination of a cylindrical member having a graduated scale provided over the peripheral surface thereof, said scale being arranged in a plurality of parallel tracks of equal length, a diagonal line extending across all of said scale tracks from beginning to end of said scale, a second scale provided adjacent said first scale, said second scale having equally spaced graduations thereon corresponding to the tracks of said first mentioned scale, and a transparent cursor having cross lines thereon for projecting any of the graduations in any of said scale tracks onto said diagonal and thence onto said second scale, whereby the exact position that any graduation lies between the ends of its respective scale track may be indicated on said second scale, and any indication on said second scale may be projected onto any of said scale tracks at a point between the ends thereof corresponding to the indication on said second scale.

7. In a device of the class described, the combination of a member having a graduated scale of angles provided thereon, the spacing of said graduations being made in accordance with the arithmetical values of the sines of the angles indicated, said scale being arranged in parallel tracks spaced equal distances apart, a diagonal line extending across all of said tracks, a second scale disposed adjacent said first mentioned scale, said second scale having main divisions corresponding to the spacings of the said scale tracks, and movable means operatively associated with said member for projecting any of the angle designations of said first scale onto said diagonal and thence onto said second scale, whereby the sine of any angle designated on said first mentioned scale may be readily ascertained.

8. In a device of the class described, the combination of a member having a graduated scale of angles provided thereon, said scale comprising a main series of scale tracks containing angles whose sines equal nine-tenths or less, a second series of scale tracks alternating with said first series containing angles whose sines range from nine-tenths to unity, and a third series of scale tracks containing angles whose sines range from nine hundred ninety-nine thousandths to unity, the graduations in all of said scale tracks being spaced in accordance with the numerical values of the sines of the angles indicated thereby, a diagonal line intersecting all of said scale tracks, a second scale adjacent said first mentioned scale having equally spaced graduations thereon corresponding to the spacings of said main scale tracks, and means for projecting the graduations in any of said scale tracks onto said diagonal and thence onto said second scale to ascertain the sine of said angles and for projecting any of the values indicated on said second scale onto said diagonal and thence onto the appropriate scale track to ascertain the angle when the sine thereof is known.

9. In a device of the class described, the combination of a cylindrical member having a graduated scale of angles provided thereon ranging from 0° to 90°, the said graduations being spaced in accordance with the arithmetical values of the sines of the angles indicated thereby, said scale being arranged in ten equally spaced tracks, a diagonal line extending across all of said tracks from the beginning of said scale to the end thereof, a second scale provided adjacent said first mentioned scale, said second scale having main divisions thereon corresponding to the spacings of said scale tracks, and a transparent cursor mounted on said member and having cross lines provided thereon for projecting any of the angle designations in said scale tracks onto said diagonal and thence onto said second scale, and for projecting any designations in said second scale onto said diagonal and thence onto any of said scale tracks, whereby the sine of any angle and the angle corresponding to any sine may be readily ascertained.

10. In a device of the class described, the combination of a cylindrical member having a graduated scale of angles ranging from 0° to 90° provided on the peripheral surface thereof, said scale comprising a main series of scale tracks whose sines equal nine-tenths or less, a second series of scale tracks alternating with said first series and including angles whose sines range from nine-tenths to unity, and a third series of scale tracks including angles whose sines range from nine hundred ninety-nine thousandths to unity, the graduations in all of said scale tracks being spaced in accordance with the numerical values of the sines of the angles indicated thereby, a diagonal line intersecting all of said scale tracks, a second scale provided adjacent said first mentioned scale having graduations thereon corresponding to the spacings of said main scale tracks, and a transparent cursor mounted on said member and having cross lines provided thereon for projecting any of the angle designations in any of said scale tracks onto said diagonal and thence onto said second scale and for projecting any designation in said second scale onto said diagonal and thence onto any of said scale tracks, whereby the sine of any angle and the angle corresponding to any sine may be readily ascertained.

11. In a device of the class described, the combination of a member having a logarithmic scale provided thereon, said scale being arranged in ten parallel tracks, a diagonal line extending across all of said tracks from the beginning of said scale to the end thereof, a second scale provided adjacent said first mentioned scale, said second scale having ten equally spaced graduations corresponding to the tracks of said first mentioned scale, each of said full scale tracks having a value equal to one-tenth in determining the mantissa of the logarithm of any number therein, the remaining decimal places of the mantissa corresponding to the position that the graduation corresponding thereto lies between the ends of its respective scale track, and means for projecting any of the graduations in said scale tracks onto said diagonal and thence onto said second scale and for projecting any indication in said second scale onto said diagonal and thence onto any of said scale tracks, whereby the logarithm of any number and the anti-logarithm of any logarithm may be readily ascertained.

12. In a device of the class described, the combination of a member having a logarithmic scale provided thereon, said scale being arranged in ten parallel tracks, a diagonal line extending across all of said tracks from the beginning of said scale to the end thereof, a reciprocal scale, said reciprocal scale being arranged in ten parallel tracks alternating with the scale tracks of said first mentioned scale, a second scale provided adjacent said first mentioned scale, said second scale having ten equally spaced graduations corresponding to the tracks of said first mentioned scale, each of said full scale tracks having a value equal to one-tenth in determining the mantissa of the logarithm of any number therein, the remaining decimal places of the mantissa corresponding to the position that the graduation corresponding thereto lies between the ends of its respective scale track, and means for projecting any of the graduations in said scale tracks onto said diagonal and thence onto said second scale and for projecting any indication in said second scale onto said diagonal and thence onto any of said scale tracks, whereby the logarithm of any number and the anti-logarithm of any logarithm may be readily ascertained.

13. In a device of the class described, the combination of a cylindrical member having a logarithmic scale provided on the peripheral surface thereof, said scale being arranged in ten parallel tracks, a diagonal line extending across all of said tracks from the beginning of said scale to the end thereof, a second scale provided adjacent said first mentioned scale, said second scale having ten equally spaced graduations thereon corresponding to the scale tracks of said first mentioned scale, each of said full scale tracks having a value equal to one-tenth in determining the mantissa of the logarithm of any number, the remaining decimal places of said mantissa corresponding to the distance that any number lies between the ends of its respective scale track, and a transparent cursor having cross lines thereon movable on said member for projecting any of the graduations in said scale tracks onto said diagonal and thence onto said second scale and for projecting any reading on said second scale onto said diagonal and thence onto any of said scale tracks, whereby the logarithm of any number and the anti-logarithm of any logarithm may be readily ascertained.

14. In a device of the class described, the combination of a cylindrical member having a logarithmic scale provided on the peripheral surface thereof, said scale being arranged in ten parallel tracks, a diagonal line extending across all of said tracks from the beginning of said scale to the end thereof, a pair of transparent cursors having cross lines provided thereon, said cursors being mounted for simultaneous and relative rotary and longitudinal movements over said scale tracks to effect multiplication and division of any combination of numbers indicated on said scale, a second scale provided adjacent said first mentioned scale, said second scale having ten equally spaced graduations thereon corresponding to the scale tracks of said first mentioned scale, each of said full scale tracks having a value equal to one-tenth in determining the mantissa of the logarithm of any number, the remaining decimal places of said mantissa corresponding to the distance that the number lies between the ends of its respective track, and said cursors being adjustable so that any number on said logarithmic scale may be projected onto said diagonal and thence onto said second scale and any reading on said second scale may be projected onto said diagonal and thence onto any of said scale tracks, whereby the logarithm of any number and the anti-logarithm of any logarithm may be readily ascertained.

15. In a device of the class described, the combination of a member having a graduated scale of angles provided thereon, said scale being arranged in parallel tracks and the graduations thereon being spaced in accordance with the tangents of the angles indicated, a diagonal line extending across all of said scale tracks from the beginning of said scale to the end thereof, a second scale provided adjacent said first mentioned scale, said second scale having graduations thereon corresponding to the tracks of said first mentioned scale, and means movable over said member for projecting any graduation in any of said tracks onto said diagonal and thence onto said second scale and for projecting any indication in said second scale onto said scale tracks, whereby the tangent of any angle and the angle corresponding to any tangent may be readily ascertained.

16. In a device of the class described, the combination of a member having a graduated scale of angles ranging from 0° to 45° provided thereon, said scale being arranged in a series of twenty parallel tracks of equal length, the graduations indicated on said scale being spaced in accordance with the tangents of angles indicated thereby, a diagonal line extending across all of said tracks from the beginning to the end of said scale, each of said full scale tracks having a value of five hundredths when ascertaining the tangents of any of the angles indicated, and the positions of the said angles between the ends of their respective scale tracks representing a fractional part of five-hundredths depending upon their positions therein, a second scale provided adjacent said first mentioned scale, said second scale having five main divisions, and means for projecting any of the graduations in said scale tracks onto said diagonal and thence onto said second scale to indicate the position of said graduation between the ends of its scale track, and for projecting any indication on said second scale onto said diagonal and thence onto any of said scale tracks, whereby the tangent of any angle and the angle corresponding to any tangent may be ascertained.

17. In a device of the class described, the combination of a cylindrical member having a graduated scale of angles ranging from 0° to 45° provided on the peripheral surface thereof, said scale being arranged in tracks and the graduations thereon being spaced in accordance with the numerical values of the tangents of the angles indicated thereby, a diagonal line extending across all of said tracks from the beginning of said scale to the end thereof, a second scale mounted adjacent said first mentioned scale having graduations thereon corresponding to the spacings of the tracks thereof, and a transparent cursor having cross lines provided thereon mounted for rotary and longitudinal movements on said cylindrical member for projecting any graduation in any of said scale tracks onto said diagonal and thence onto said second scale and for projecting any designation in said second scale onto said diagonal and thence onto any of said scale tracks, whereby the tangent of any angle and the angle corresponding to any tangent may be readily ascertained.

18. In a device of the class described, the combination of a cylindrical member having a graduated scale of angles arranged in parallel tracks on its peripheral surface near one end thereof, the graduations in said scale being spaced in accordance with the numerical values of the sines of the angles indicated thereby, a diagonal line extending across all of said tracks from beginning to end of said scale, an intermediate logarithmic scale arranged in parallel tracks coinciding with the tracks of said first mentioned scale, a reciprocal scale arranged in parallel tracks alternating with the tracks of said logarithmic scale, a diagonal line extending across all of the tracks of said logarithmic and reciprocal scales, a relatively narrow scale provided between said first mentioned scale and said logarithmic and reciprocal scales having graduations thereon corresponding to the spacings of said scale tracks, a graduated scale of angles provided near the other end of said member, said scale being arranged in parallel tracks and the graduations thereof being spaced in accordance with the tangents of the angles indicated, a diagonal line extending across all of said tracks from the beginning of said scale to the end thereof, a relatively narrow scale provided between said last mentioned scale and said logarithmic and reciprocal scales having graduations corresponding to the spacings of the tracks thereof, a pair of transparent cursors mounted for simultaneous and relative rotary and longitudinal movements over all of said scales for effecting multiplication and division of any combination of numbers on said logarithmic scale and for projecting any of the graduations in said logarithmic scale onto the associated diagonal and thence onto said relatively narrow scale and for projecting any indication on said relatively narrow scale onto said diagonal and thence onto said logarithmic scale for ascertaining logarithms and anti-logarithms, respectively, and said cursors being adapted to project any of the angle graduations on said first mentioned scale onto its associated diagonal and thence onto said relatively narrow scale and to project any indication on said relatively narrow scale onto said diagonal and thence onto said angle scale, whereby the sines of any angles and the angles corresponding to any sines may be ascertained, and said cursors being further adapted to project any of the angle designations in said tangent scale onto the associated diagonal and thence onto the relatively narrow scale adjacent thereto and to project any indication on said relatively narrow scale onto said tangent scale, whereby the tangent of any angle and the angle corresponding to any tangent may be readily ascertained.

19. In a device of the class described, the combination of a member having a logarithmic scale provided thereon arranged in substantially parallel tracks, and a pair of cursors operatively associated with said member and adapted for at least two-dimensional movement over said scale, each of said cursors having a pair of hairlines provided thereon spaced apart a distance equal to substantially the length of said tracks and a second pair of hairlines arranged at substantially right angles to said first mentioned hairlines.

20. In a device of the class described, the combination of a member having a logarithmic scale provided thereon arranged in substantially parallel tracks, and a pair of cursors operatively associated with said member and adapted for at least two-dimensional movement over said scale, each of said cursors having a pair of hairlines provided thereon spaced apart a distance equal to substantially the length of said tracks and a second pair of hairlines arranged at substantially right angles to said first mentioned hairlines and intersecting the latter, the points of intersection of said pairs of hairlines being spaced apart in a direction at right angles to said tracks a distance equal to substantially the width of one of said tracks.

21. In a device of the class described, the combination of a cylindrical member having a logarithmic scale provided on the peripheral surface thereof, said scale being arranged in a plurality of substantially parallel tracks of equal length, a cylindrical transparent cursor mounted on said cylindrical member having spaced circumferential hairlines provided thereon, said hairlines being spaced apart a distance equal to substantially the length of said scale tracks, and an additional pair of hairlines provided on said cursor, one of said last mentioned hairlines intersecting each of said first mentioned hairlines and said last mentioned pair of hairlines being spaced apart circumferentially a distance equal to substantially the width of one of said scale tracks.

22. In a device of the class described, the combination of a cylindrical member having a logarithmic scale provided on the peripheral surface thereof, said scale being arranged in a plurality of substantially parallel tracks of equal length, and a pair of cylindrical transparent cursors mounted on said cylindrical member, each of said transparent cursors having provided thereon spaced circumferential hairlines, said hairlines being spaced apart a distance equal to the length of said scale tracks, and a second pair of hairlines provided on each of said cursors, said last mentioned pair of hairlines intersecting said first mentioned hairlines and being spaced apart circumferentially a distance equal to substantially the width of one of said scale tracks.

23. In a device of the class described, the combination of a cylindrical member having a logarithmic scale provided on the surface thereof, said scale being arranged in a plurality of substantially parallel tracks of equal length, and a pair of cylindrical transparent cursors mounted on said cylindrical member, said cursors being disposed in telescoping relation and being mounted for simultaneous and relative rotary and longitudinal movements over said scale tracks to effect multiplication and division of any combination of numbers indicated on said scale, each of said cursors having provided thereon spaced circumferential hairlines, said hairlines being spaced apart a distance equal to substantially the length of said scale tracks, and a second pair of hairlines provided on each of said cursors, said last mentioned hairlines intersecting said first mentioned hairlines and being spaced apart circumferentially a distance equal to substantially the width of one of said scale tracks.

24. A cursor for slide rules comprising a cylindrical body portion constructed of transparent material, said body portion having a pair of spaced circumferential hairlines provided thereon, and a longitudinally extending hairline intersecting said first mentioned hairlines at substantially right angles.

25. A cursor for slide rules comprising a cylindrical body portion constructed of transparent material, said body portion having a pair of spaced circumferential hairlines provided thereon, a longitudinally extending hairline intersecting said first mentioned hairlines at substantially right angles, and a relatively short hairline intersecting each of said first mentioned hairlines, said last mentioned hairlines being circumferentially spaced.

26. A cursor for slide rules comprising a tubular body portion, and spaced projections extending inwardly from said body portion.

27. A cursor for slide rules comprising a tubular body portion, spaced projections extending inwardly from said body portion, and cross-hairlines provided on the periphery of said body portion.

BENEDICT D. KAHAN.

REFERENCES CITED

The following references are of record in the file of this patent:

UNITED STATES PATENTS

| Number | Name | Date |
| --- | --- | --- |
| 1,040,592 | Thomas | Oct. 8, 1912 |
| 1,330,132 | Nieman | Feb. 10, 1920 |
| 2,137,630 | Sinitzin-White | Nov. 22, 1938 |
| 2,265,372 | Johnson et al. | Dec. 9, 1941 |

FOREIGN PATENTS

| Number | Country | Date |
| --- | --- | --- |
| 370,481 | Germany | Mar. 3, 1923 |
| 743,290 | France | Jan. 6, 1933 |

Certificate of Correction

Patent No. 2,511,270                       June 13, 1950

BENEDICT D. KAHAN

It is hereby certified that error appears in the printed specification of the above numbered patent requiring correction as follows:

Column 3, line 71, for "54° 10'" read *64° 10'*; column 6, line 25, for "(9)" read *(.9)*; column 9, line 58, for "staring" read *starting*; column 11, line 50, strike out "Scale section 8, it will be observed, is divided" and insert the same before the words "into five" in line 49, same column; column 13, line 28, for "describe" read *described*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*